United States Patent Office.

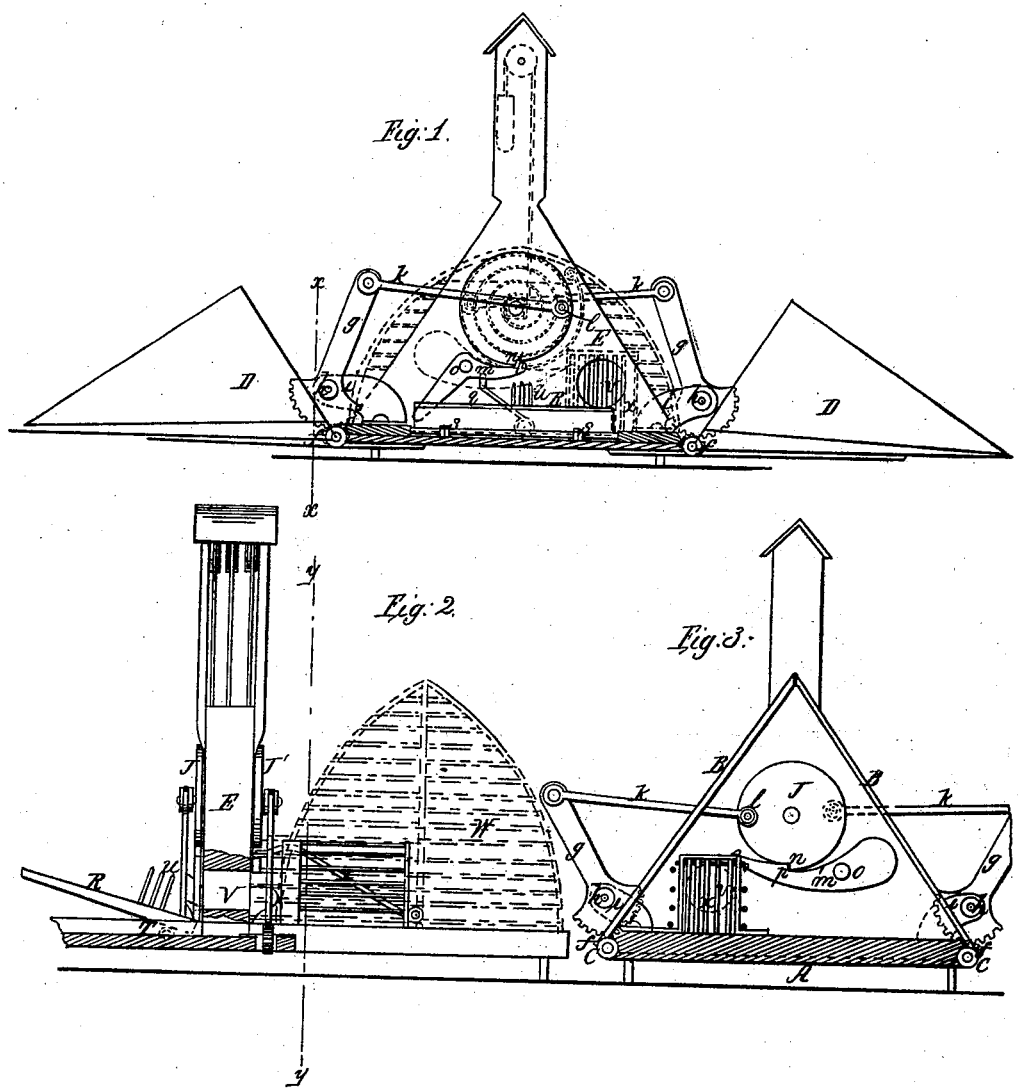

THOMAS B. VAN PELT, OF WESTPORT, MISSOURI.

Letters Patent No. 92,911, dated July 20, 1869.

IMPROVED ANIMAL-TRAP.

The Schedule referred to in these Letters Patent and making part of the same.

*To all whom it may concern:*

Be it known that I, THOMAS B. VAN PELT, of Westport, in the county of Jackson, and State of Missouri, have invented a new and useful Improvement in Rat and Game-Traps; and I do hereby declare that the following is a full, clear, and exact description thereof, which will enable others skilled in the art to make and use the same, reference being had to the accompanying drawings, forming part of this specification.

This invention relates to new and useful improvements in traps for catching rats and other animals; and consists in the construction and arrangement of parts, as hereinafter described.

In the accompanying sheet of drawings—

Figure 1 represents the trap open, or set.

Figure 2 is a sectional elevation, showing the wire cage, the sectional part being through the line $x\ x$ of fig. 1.

Figure 3 represents a vertical section, through the line $y\ y$ of fig. 2.

Similar letters of reference indicate corresponding parts.

A is the platform or bottom.

B B represent wings or shutters, which are hinged to the platform on each side, as seen at C C, with a triangular piece, D, attached to each wing, which, when the wings are closed up, as seen in fig. 3, close up the end of the trap in the roof-form.

E is a triangular-shaped stand, which receives the wings at their opposite ends, thus making a tight box when the trap is sprung.

This stand E encloses a spring, the recoil of which spring opens and closes the trap.

The hinges C C, by which the wings are attached to the bed or platform, consist of rods passing through eyes, upon which rods are small pinions, $f\ f$, which engage with the sector-levers $g\ g$, which levers have their fulcra at $h\ h$, on the projecting arms $i\ i$.

The coil-spring is seen in dotted line in the stand E.

It is attached to a central shaft, to the ends of which shaft, on the outside of the stand E, are the disk-wheels J J', (one on each side of the stand.)

The other end of the spring is attached to the inside of the stand, so that when the spring is wound up, its recoil will rotate the disks J J', and thereby operate the trap.

Weights may be used, if desired, for this purpose, as seen in dotted lines in the drawing, the stand E being extended vertically for this purpose.

The sector-levers $g\ g$ are connected with the disk-wheels J J', by the rods $k\ k$, on the sides of the stand.

The connections are made on the outer edges, or near the peripheries of the wheels, as seen at $l$, so that half of a revolution gives the sector-levers $g$ a throw sufficient to close the trap, as seen in fig. 3, or open it, as seen in fig. 1.

Each of the disk-wheels J J' is provided with a trigger, $m\ m'$, which engages with the wheels by means of the notches $n$.

These triggers are weighted levers, working on the pivots $o\ o$, the preponderating weight of their back ends keeping their hooks $p$ in constant contact with the periphery of the wheels; but a spring may be added, to insure the proper action of one or both, as seen at $q$.

R represents the pan of the trap, which is hinged to platform A, as seen at $s\ s$.

The pan is slightly raised when the trap is set, as seen in fig. 2, and acts as a lever to raise the end of the trigger $m$, when a weight is placed upon it, the fulcrum being the hinge of the pan, as seen at T.

U represents forks, to which the bait is attached.

When the rat or other animal gets on to the pan to reach the bait, the effect is to disengage the trigger $m$ from the wheel J, which allows both wheels to make half a revolution. This closes the trap or box, and secures the animal therein.

In attempting to escape, the animal darts through a hole, V, in the stand E, and into the cage W, but in doing so, it raises an inclined wire-drop, X. This drop acts as a lever to detach the other trigger $m'$ from the wheel J', which allows the wheels to make another half revolution, which throws open the wings, and sets the trap again, as seen in fig. 1, while the animal is secured in the cage W.

This operation of alternately closing and opening the trap will continue as long as animals reach the bait, and recoiling force remains in the spring.

The spring is wound up by detaching either one or both the connecting-rods $k\ k$, and turning round the wheels by one of the connecting-pins.

It will be seen that in this trap there is nothing to frighten or scare the animal. There is no going in, up, or under anything. He is simply on a floor where nothing looks suspicious to him.

The advantages of this arrangement are many, and must be obvious to all.

Having thus described my invention,

I claim as new, and desire to secure by Letters Patent—

1. The construction and arrangement of the wings B B, the disk-wheels J J', triggers $m\ m'$, sector-levers $g\ g$, with their pinions $f\ f$, and the pan R, operated by either a spring or weight, or by both combined, substantially as and for the purposes herein shown and described.

2. In combination with the above, the cage W, when said cage is provided with the drop X, engaging with the trigger $m'$, whereby the animal entering the cage raises the drop, to operate the trigger and set the trap, as herein shown and described.

THOMAS B. VAN PELT.

Witnesses:
W. A. BEVIS,
A. WASKEY.